US007107697B2

(12) United States Patent
Schwarz et al.

(10) Patent No.: US 7,107,697 B2
(45) Date of Patent: Sep. 19, 2006

(54) MEASURING POINT BOLT AND METHOD OF MAKING THE BOLT

(75) Inventors: Helmut Schwarz, Weil der Stadt (DE); Bernhard Homner, Calw (DE)

(73) Assignee: Schwarz Verbindungs-Systeme GmbH, Althengstett (DE)

(*) Notice: Subject to any disclaimer, the term of this patent is extended or adjusted under 35 U.S.C. 154(b) by 98 days.

(21) Appl. No.: 10/885,069

(22) Filed: Jul. 7, 2004

(65) Prior Publication Data

US 2005/0005469 A1 Jan. 13, 2005

(30) Foreign Application Priority Data

Jul. 9, 2003 (DE) .......................... 203 10 503 U

(51) Int. Cl.
*F16B 35/02* (2006.01)

(52) U.S. Cl. .......................... 33/613; 33/574; 411/383

(58) Field of Classification Search ................. 33/613, 33/520, 645, 600, 574, 577, 608; 411/383, 411/395

See application file for complete search history.

(56) References Cited

U.S. PATENT DOCUMENTS 1,225,315 A * 5/1917 Conrad ........................ 33/562
2,355,513 A * 8/1944 Cox ........................... 411/441
2,368,651 A * 2/1945 Flannery ..................... 411/381
2,419,134 A * 4/1947 Hall ............................ 33/520
3,159,075 A * 12/1964 Bjork .......................... 411/65
3,267,793 A * 8/1966 Devine et al. ................ 411/51
3,916,970 A * 11/1975 Owens ........................ 411/34
4,710,082 A * 12/1987 Curtis ........................ 411/373
4,895,016 A * 1/1990 Cameron et al. ............ 33/600
5,138,772 A * 8/1992 Barnes ........................ 33/613
5,193,286 A 3/1993 Collier
5,392,027 A * 2/1995 Brunot et al. .......... 73/862.041
5,634,755 A * 6/1997 Jones, Jr. .................... 411/383
6,298,572 B1 10/2001 McAuley
6,748,667 B1 * 6/2004 Sevastian ................. 33/501.45

FOREIGN PATENT DOCUMENTS

DE 2530662 7/1975

(Continued)

OTHER PUBLICATIONS

English Language Abstract of JP 58-202742.

(Continued)

*Primary Examiner*—Diego Gutierrez
*Assistant Examiner*—Travis Reis
(74) *Attorney, Agent, or Firm*—Greenblum & Bernstein, P.L.C.

(57) ABSTRACT

Measuring-point bolt including a body having a first end and a second end. The first end has an internal opening adapted to receive a measuring device pin. The second end is adapted connect to a hollow pin of another measuring device. A main internal opening is arranged within the body and communicates with the internal opening of the first end. A spring is arranged within the main internal opening. A element is movably arranged within the body. The element is structured and arranged to prevent entry of foreign particles into the body. A sealing member is at least one of non-removably connected to the second end and permanently fixed to the second end. The sealing member is adapted to prevent equalization of air pressure between an outside atmosphere and the main internal opening. This Abstract is not intended to define the invention disclosed in the specification, nor intended to limit the scope of the invention in any way.

31 Claims, 1 Drawing Sheet

FOREIGN PATENT DOCUMENTS

| | | |
|---|---|---|
| DE | 3039894 | 5/1981 |
| DE | 3803031 | 8/1988 |
| DE | 3722518 | 1/1989 |
| DE | 3438277 | 10/1991 |
| JP | 58-202742 | 11/1983 |

OTHER PUBLICATIONS

English Language Abstract of DE 2530662.
English Language Abstract of DE 3722518.
English Language Abstract of DE 3803031.

* cited by examiner

MEASURING POINT BOLT AND METHOD OF MAKING THE BOLT

CROSS-REFERENCE TO RELATED APPLICATIONS

The present application claims priority under 35 U.S.C. § 119 of German Patent Application No. 203 10 503.6, filed on Jul. 9, 2003, the disclosure of which is expressly incorporated by reference herein in its entirety.

BACKGROUND OF THE INVENTION

1. Field of the Invention

The invention relates to a measuring-point bolt for the temporary attachment of measuring devices to both ends of the bolt.

2. Discussion of Background Information

The accuracy of the dimensions of certain objects (e.g. aircraft) is monitored during and after assembly, after a certain number of hours of operation, or following abnormal stress. For this purpose, measurement points are provided (e.g. on aircraft) from which the dimensional accuracy can be checked using measuring devices.

Such a measuring points are formed by a bolt which is connected permanently to the wall of the aircraft and which has two free ends, i.e., one on either side of the wall. When required, measurement devices are located temporarily on the ends of these bolts.

Measuring-point bolts of the following type e.g., AIRBUS standard NSA9501, have been in use. FIG. 2 illustrates such a device. The measuring-point bolt 1' has a flange 2' for attaching the bolt 1' to the wall of the aircraft. In the direction of the bolt axis, there is provided an interior hole 5' for receiving a spiral pressure spring 6'. At bolt end A' there is arranged a threaded insert 10' which forms a stop for the pressure spring 6'. End A' also has a bore 3' for receiving a pin which is connected with a first measuring device.

When the measuring device pin is inserted into the receiving bore 3', an element 9' which is movably located in the bore 3', which is connected with the pressure spring 6' and which serves to prevent entry of undesirable foreign particles, is pressed in direction D against the biasing force of the pressure spring 6'.

When the measuring device pin is removed from the interior bore 3', the pressure spring 6' pushes the element 9 back in the direction of the opening of the interior bore 3', i.e., opposite direction D.

The other bolt end B' of the bolt 1' has a cylindrical outer-shaft area 4'. This end B' is designed to be connected to a hollow bolt of a second measuring device (not shown). In this arrangement, the hollow bolt can be pushed onto the other end B'.

The end B' includes a closed base 7', which passes over into a wall of the hollow bolt. The closed base 7' ensures that when the measuring-point bolt is installed in the wall of aircraft, no equalization of air pressure can take place between the interior bore 5' and an area outside the bolt-end B' (to the left of the imaginary wall of the aircraft).

High tolerance demands are increasingly being made on such measuring-point bolts. However, known measuring-point bolt are no longer able to fulfil these demands. This is because they utilize a threaded insert 10' (with the screw-in area 10") which is inserted relatively "inaccurately" into the bolt end A'.

SUMMARY OF THE INVENTION

The invention aims to improve the known measuring-point bolt to ensure that it meets higher tolerance requirements.

The invention provides that the "inaccurate" insert is replaced by a bore for receiving the pin which is drilled directly into the imaginary "full" material at bolt end A, and which meets the highest tolerance requirements. At the other end of the bolt (up to the connection with the bore for receiving the pin) an internal bore is provided to receive the pressure spring with the movable element for receiving the pin in order to prevent the entry of foreign particles. The opening of the internal bore at the other bolt end is closed firmly by a sealing base. If necessary, this fixed connection guarantees that no equalization in air pressure can take place through it.

The invention also provides for a measuring-point bolt comprising a body comprising a first end and a second end. The first end comprises an internal opening adapted to receive a measuring device pin. The second end is adapted connect to a hollow pin of another measuring device. A main internal opening is arranged within the body and communicates with the internal opening of the first end. A spring is arranged within the main internal opening. An element is movably arranged within the body. The element is structured and arranged to prevent entry of foreign particles into the body. A sealing member is at least one of non-removably connected to the second end and permanently fixed to the second end. The sealing member is adapted to prevent equalization of air pressure between an outside atmosphere and the main internal opening.

The sealing member and the element may prevent equalization of air pressure between an outside atmosphere and the main internal opening. The internal opening may comprise an axial opening. The main internal opening may comprise an axial opening. The internal opening may be formed by drilling an opening directly into material forming the first end of the body. The first end and the body may comprise a one-piece member.

The bolt may further comprise a flange connected to the body. The first end, the flange, and the body may comprises a one-piece member.

The sealing member may be arranged within a recess in the second end. The sealing member may be structured and arranged to slide into the second end after insertion of the element and the spring into the main internal opening from the second end. The first and second ends may each comprise a cylindrical outer surface and the spring may comprise a helical compression spring. The sealing member may be arranged within an internal concentric recess arranged in the second end.

The bolt may further comprise a sealing device structured and arranged to provide sealing between the body and the sealing member. The sealing device may comprise a sealing ring made of an elastic material.

The second end may comprise an outer cylindrical surface.

The invention also provides for a method of making the bolt described above wherein method comprises drilling the internal opening into the first end, inserting the element and the spring into the body from the second end, and securing the sealing member to the second end of the body.

The invention also provides for a measuring-point bolt comprising a one-piece body comprising a flange, a first end projecting from one side of the flange, and a second end projecting from another side of the flange. The first end comprises an internal opening and being adapted to connect to a measuring device. The second end is adapted connect to another measuring device. A main internal opening is arranged within the body and communicating with the internal opening of the first end. An element is movably arranged within the body. The element is structured and arranged to prevent entry of foreign particles into the body. A sealing cap is at least one of non-removably connected to the second end and permanently fixed to the second end. A spring is arranged between within the main internal opening between the sealing member and the element. The spring biases the element towards the first end.

The sealing cap and the element may prevent equalization of air pressure between an outside atmosphere and the main internal opening. The sealing cap may be disk-shaped and may be arranged within a recess in the second end. The sealing cap may be structured and arranged to slide into the second end after insertion of the element and the spring into the main internal opening from the second end. The sealing member may be arranged within an internal concentric recess arranged in the second end.

The bolt may further comprise a sealing device structured and arranged to provide sealing between the body and the sealing cap. The sealing device may comprise a sealing ring made of an elastic material.

The invention also provides for a method of making the bolt of described above wherein the method comprises forming the internal opening into the first end, inserting the element and the spring into the body from the second end, and securing the sealing cap to the second end of the body.

The invention also provides for a measuring-point bolt comprising a one-piece body comprising a flange, a first end projecting from one side of the flange, and a second end projecting from another side of the flange. The second end extends from the flange by a greater distance than the first end. The first end comprises an internal opening and being adapted to connect to a measuring device. The second end is adapted connect to another measuring device. A main internal opening is arranged within the body and communicating with the internal opening of the first end. The internal opening has a smaller diameter than the main internal opening. An element is movably arranged within the body and comprising a large end and a smaller end. The element is structured and arranged to prevent entry of foreign particles into the body from the first end. A sealing cap is at least one of non-removably connected to the second end and permanently fixed to the second end. The sealing cap is structured and arranged to prevent entry of foreign particles into the body from the second end. A spring is arranged between within the main internal opening between the sealing member and the element. The flange comprises openings for connecting the bolt to a wall.

The invention also provides for a method of making the bolt described above wherein the method comprises forming the internal opening into the first end, inserting the element and the spring into the body from the second end, and securing the sealing cap to the second end of the body The invention also provides for a method of making the bolt described above wherein the method comprises drilling the internal opening into the first end, inserting the element and the spring into the body from the second end, and securing the sealing cap to the second end of the body.

BRIEF DESCRIPTION OF THE DRAWINGS

The present invention is further described in the detailed description which follows, in reference to the noted plurality of drawings by way of non-limiting exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
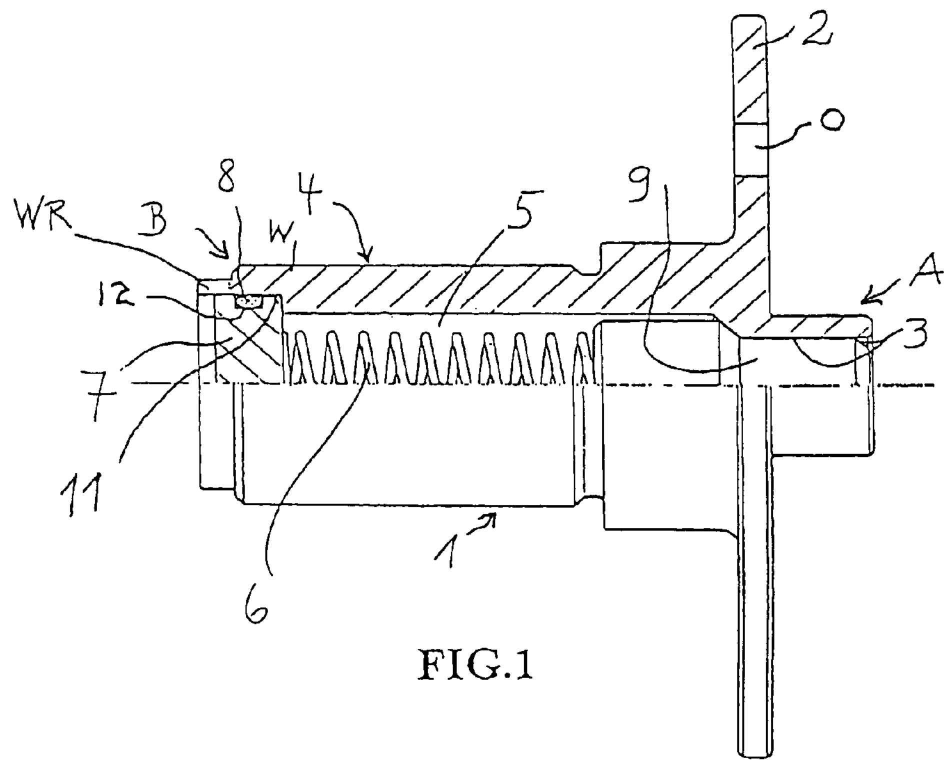
FIG. 1 shows a partial cross-sectional view of the measuring-point bolt according to the invention.
Figure 2:
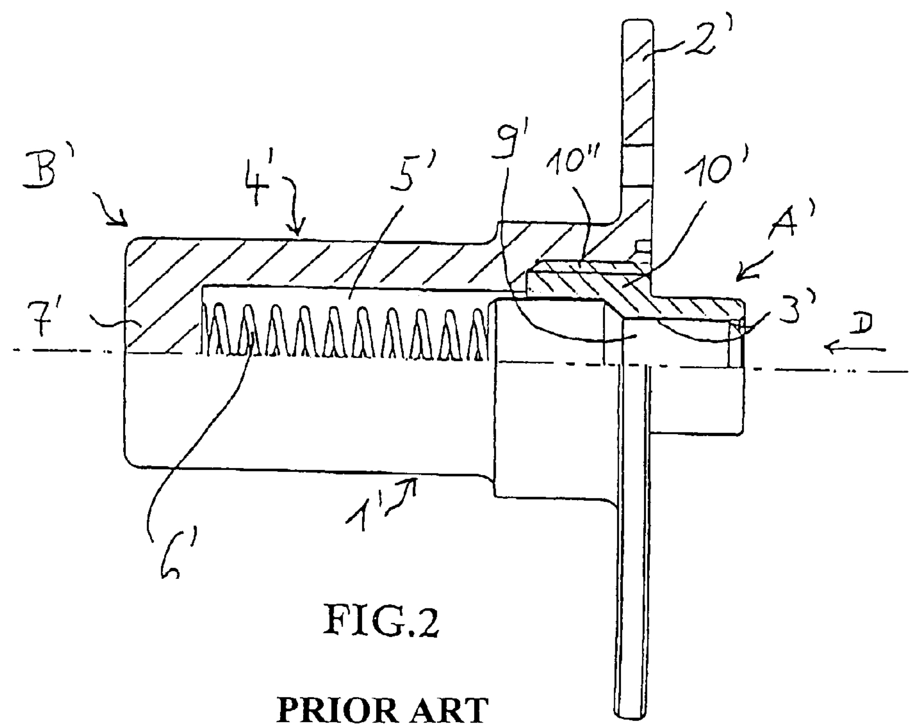
FIG. 2 shows a partial cross-sectional view of a measuring-point bolt according to prior art.

With reference to FIG. 1, the measuring-point bolt 1 has a flange 2 for attaching the bolt 1 to a wall (e.g. a wall in an aircraft) via openings O. The bolt 1 has ends A and B which can be located on opposite sides of the wall. As with the prior art device shown in FIG. 2, the bolt 1 shown in FIG. 1 is designed so that measuring devices can be attached thereto by pushing them into or onto the bolt 1. For this purpose, bolt end A has an internal bore or opening 3 which extends or runs axially into the bolt 1. The bore 3 is configured to receive therein a pin that is connected to a first measuring device. The other end of the bolt B has a cylindrical area 4, onto which a hollow pin of a second measuring device can be pushed in the axial direction of the bolt 1.

The measuring-point bolt 1 has an axial internal bore 5 which is connected with the bore 3 for receiving the pin of the first measuring device. A pressure spring 6 is located within the bore 5. A movable element 9 is connected to the spring 6. The movable element 9 has a rear end portion and a smaller end portion which moves in the bore 3. The element 9 is utilized to prevent the entry of undesirable foreign particles into the bolt 1.

The bore 3 for receiving the measuring device pin can be formed by drilling an opening directly into bolt material forming bolt end A. This bore 3 can be drilled or otherwise formed in a manner which meets the highest tolerance requirements.

The internal bore 5, with the pressure spring 6 located therein, is closed-off with a sealing member or base 7. Once the spring and element 9 are placed in the bolt 1, the base 7 can be slid into end B and connected thereto.

The sealing base 7 is sized so as to be located and/or positioned in a concentric recess 11 arranged in an interior of the end B of the bolt 1. The base 7 can be non-removably connected and/or connected permanently to the end B by, e.g., bonding, crimping, caulking, etc. According to one non-limiting embodiment, the projecting wall WR of the bolt wall W is deflected and/or bent inwardly to prevent removal of the base 7.

A sealing member or ring 8, which can be made of an elastic material, is located and/or arranged between the bolt wall W and the sealing base 7. The ring 8 is positioned within a peripheral groove 12 formed in the sealing base 7. The ring 8 can be of any desired type such as, e.g., an O-ring of circular cross-section.

It is noted that the foregoing examples have been provided merely for the purpose of explanation and are in no way to be construed as limiting of the present invention. While the present invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

What is claimed is:

1. A measuring-point bolt comprising:

a body comprising a first end and a second end;

the first end comprising an internal opening adapted to receive a measuring device pin;

the second end being adapted to connect to a hollow pin of another measuring device;

a main internal opening arranged within the body and communicating with the internal opening of the first end;

a spring arranged within the main internal opening;

an element movably arranged within the body;

the element is structured and arranged to prevent entry of foreign particles into the body; and a sealing member being a separate and distinct part from the body and being at least one of:

non-removably connected to the second end, and permanently fixed to the second end, wherein the sealing member is adapted to prevent equalization of air pressure between an outside atmosphere and the main internal opening, and wherein the element is inserted into the body via the second end.

2. The bolt of claim 1, wherein the sealing member and the element prevent equalization of air pressure between an outside atmosphere and the main internal opening.

3. The bolt of claim 1, wherein the internal opening comprises an axial opening.

4. The bolt of claim 1, wherein the main internal opening comprises an axial opening.

5. The bolt of claim 1, wherein the internal opening is formed by drilling an opening directly into material forming the first end of the body.

6. The bolt of claim 1, wherein the first end and the body comprises a one-piece member.

7. The bolt of claim 1, further comprising a flange connected to the body.

8. The bolt of claim 7, wherein the first end, the flange, and the body comprises a one-piece member.

9. The bolt of claim 1, wherein the first and second ends each comprise a cylindrical outer surface and wherein the spring comprises a helical compression spring.

10. The bolt of claim 1, wherein the second end comprises an outer cylindrical surface.

11. A method of making the bolt of claim 1, the method comprising:

inserting the element and the spring into the body from the second end; and securing the sealing member to the second end of the body.

12. A method of making the bolt of claim 1, the method comprising:

drilling the internal opening into the first end;

inserting the element and the spring into the body from the second end; and securing the sealing member to the second end of the body.

13. A measuring-point bolt comprising:

a body comprising a first end and a second end;

the first end comprising an internal opening adapted to receive a measuring device pin;

the second end being adapted to connect to a hollow pin of another measuring device;

a main internal opening arranged within the body and communicating with the internal opening of the first end;

a spring arranged within the main internal opening;

an element movably arranged within the body;

the element is structured and arranged to prevent entry of foreign particles into the body; and a sealing member being at least one of:

non-removably connected to the second end, and permanently fixed to the second end, wherein the sealing member is adapted to prevent equalization of air pressure between an outside atmosphere and the main internal opening, and wherein the sealing member is arranged within a recess in the second end.

14. A measuring-point bolt comprising:

a body comprising a first end and a second end;

the first end comprising an internal opening adapted to receive a measuring device pin;

the second end being adapted to connect to a hollow pin of another measuring device;

a main internal opening arranged within the body and communicating with the internal opening of the first end;

a spring arranged within the main internal opening;

an element movably arranged within the body;

the element is structured and arranged to prevent entry of foreign particles into the body; and a sealing member being at least one of:

non-removably connected to the second end, and permanently fixed to the second end, wherein the sealing member is adapted to prevent equalization of air pressure between an outside atmosphere and the main internal opening, and wherein the sealing member is structured and arranged to slide into the second end after insertion of the element and the spring into the main internal opening from the second end.

15. A measuring-point bolt comprising:

a body comprising a first end and a second end;

the first end comprising an internal opening adapted to receive a measuring device pin;

the second end being adapted to connect to a hollow pin of another measuring device;

a main internal opening arranged within the body and communicating with the internal opening of the first end;

a spring arranged within the main internal opening;

an element movably arranged within the body;

the element is structured and arranged to prevent entry of foreign particles into the body; and a sealing member being at least one of:
non-removably connected to the second end, and
permanently fixed to the second end,
wherein the sealing member is adapted to prevent equalization of air pressure between an outside atmosphere and the main internal opening, and
wherein the sealing member is arranged within an internal concentric recess arranged in the second end.

16. A measuring-point bolt comprising:
a body comprising a first end and a second end;
the first end comprising an internal opening adapted to receive a measuring device pin;
the second end being adapted to connect to a hollow pin of another measuring device;
a main internal opening arranged within the body and communicating with the internal opening of the first end;
a spring arranged within the main internal opening;
an element movably arranged within the body;
the element is structured and arranged to prevent entry of foreign particles into the body; and
a sealing member being at least one of:
non-removably connected to the second end, and
permanently fixed to the second end; and
a sealing device structured and arranged to provide sealing between the body and the sealing member,
wherein the sealing member is adapted to prevent equalization of air pressure between an outside atmosphere and the main internal opening.

17. The bolt of claim 16, wherein the sealing device comprises a sealing ring made of an elastic material.

18. A measuring-point bolt comprising:
a one-piece body comprising a flange, a first end projecting from one side of the flange, and a second end projecting from another side of the flange;
the first end comprising an internal opening and being adapted to connect to a measuring device;
the second end being adapted to connect to another measuring device;
a main internal opening arranged within the body and communicating with the internal opening of the first end;
an element movably arranged within the body;
the element is structured and arranged to prevent entry of foreign particles into the body;
a sealing cap being a separate and distinct part from the body and being at least one of:
non-removably connected to the second end, and
permanently fixed to the second end; and
a spring arranged between within the main internal opening between the sealing cap and the element,
wherein the spring biases the element towards the first end, and
wherein the element, the spring, and the sealing cap is inserted into the body via the second end.

19. The bolt of claim 18, wherein the sealing cap and the element prevent equalization of air pressure between an outside atmosphere and the main internal opening.

20. A method of making the bolt of claim 18, the method comprising:
inserting the element and the spring into the body from the second end; and
securing the sealing cap to the second end of the body.

21. A method of making the bolt of claim 18, the method comprising:
forming the internal opening into the first end;
inserting the element and the spring into the body from the second end; and
securing the sealing cap to the second end of the body.

22. A measuring-point bolt comprising:
a one-piece body comprising a flange, a first end projecting from one side of the flange, and a second end projecting from another side of the flange;
the first end comprising an internal opening and being adapted to connect to a measuring device;
the second end being adapted connect to another measuring device;
a main internal opening arranged within the body and communicating with the internal opening of the first end;
an element movably arranged within the body;
the element is structured and arranged to prevent entry of foreign particles into the body;
a sealing cap being at least one of:
non-removably connected to the second end, and
permanently fixed to the second end; and
a spring arranged between within the main internal opening between the sealing cap and the element,
wherein the spring biases the element towards the first end, and
wherein the sealing cap is disk-shaped and is arranged within a recess in the second end.

23. A measuring-point bolt comprising:
a one-piece body comprising a flange, a first end projecting from one side of the flange, and a second end projecting from another side of the flange;
the first end comprising an internal opening and being adapted to connect to a measuring device;
the second end being adapted connect to another measuring device;
a main internal opening arranged within the body and communicating with the internal opening of the first end;
an element movably arranged within the body;
the element is structured and arranged to prevent entry of foreign particles into the body;
a sealing cap being at least one of:
non-removably connected to the second end, and
permanently fixed to the second end; and
a spring arranged between within the main internal opening between the sealing cap and the element,
wherein the spring biases the element towards the first end, and
wherein the sealing cap is structured and arranged to slide into the second end after insertion of the element and the spring into the main internal opening from the second end.

24. A measuring-point bolt comprising:
a one-piece body comprising a flange, a first end projecting from one side of the flange, and a second end projecting from another side of the flange;
the first end comprising an internal opening and being adapted to connect to a measuring device;
the second end being adapted connect to another measuring device;
a main internal opening arranged within the body and communicating with the internal opening of the first end;
an element movably arranged within the body;

the element is structured and arranged to prevent entry of foreign particles into the body;

a sealing cap being at least one of:

non-removably connected to the second end, and permanently fixed to the second end; and a spring arranged between within the main internal opening between the sealing cap and the element, wherein the spring biases the element towards the first end, and wherein the sealing member is arranged within an internal concentric recess arranged in the second end.

25. A measuring-point bolt comprising:

a one-piece body comprising a flange, a first end projecting from one side of the flange, and a second end projecting from another side of the flange;

the first end comprising an internal opening and being adapted to connect to a measuring device;

the second end being adapted connect to another measuring device;

a main internal opening arranged within the body and communicating with the internal opening of the first end;

an element movably arranged within the body;

the element is structured and arranged to prevent entry of foreign particles into the body;

a sealing cap being at least one of:

non-removably connected to the second end, and permanently fixed to the second end; and a sealing device structured and arranged to provide sealing between the body and the sealing cap;

a spring arranged between within the main internal opening between the sealing cap and the element, wherein the spring biases the element towards the first end.

26. The bolt of claim 25, wherein the sealing device comprises a sealing ring made of an elastic material.

27. A measuring-point bolt comprising:

a one-piece body comprising a flange, a first end projecting from one side of the flange, and a second end projecting from another side of the flange;

the second end extending from the flange by a greater distance than the first end;

the first end comprising an internal opening and being adapted to connect to a measuring device;

the second end being adapted to connect to another measuring device;

a main internal opening arranged within the body and communicating with the internal opening of the first end;

the internal opening having a smaller diameter than the main internal opening;

a element movably arranged within the body and comprising a large end and a smaller end;

the element being structured and arranged to prevent entry of foreign particles into the body from the first end;

a sealing cap being at least one of non-removably connected to the second end and permanently fixed to the second end;

the sealing cap being structured and arranged to prevent entry of foreign particles into the body from the second end; and a spring arranged between within the main internal opening between the sealing cap and the element, wherein the flange comprises openings for connecting the bolt to a wall, and wherein the sealing can is a separate and distinct part from the body.

28. A method of making the bolt of claim 27, the method comprising:

inserting the element and the spring into the body from the second end; and securing the sealing cap to the second end of the body.

29. A method of making the bolt of claim 27, the method comprising:

forming the internal opening into the first end;

inserting the element and the spring into the body from the second end; and securing the sealing cap to the second end of the body.

30. A method of making the bolt of claim 27, the method comprising:

drilling the internal opening into the first end;

inserting the element and the spring into the body from the second end; and securing the sealing cap to the second end of the body.

31. A measuring-point bolt permanently connected to a wall of an aircraft, the measuring-point bolt comprising:

a body comprising a first end and a second end;

the first end comprising an internal opening adapted to receive a measuring device pin;

the second end being adapted to connect to a hollow pin of another measuring device;

a main internal opening arranged within the body and communicating with the internal opening of the first end;

a spring arranged within the main internal opening;

an element movably arranged within the body and connected to the spring;

the element is structured and arranged to prevent entry of foreign particles into the body;

a sealing member being a separate and distinct part from the body and non-removably connected and permanently fixed to the second end; and the sealing member being adapted to prevent equalization of air pressure between an outside atmosphere and the main internal opening, wherein the internal opening of the first end is a drilled hole directly within a material forming the first end of the body.

* * * * *